No. 814,275. PATENTED MAR. 6, 1906.
W. H. COLLIER.
VALVE GEAR FOR STEAM AND OTHER FLUID PRESSURE ENGINES.
APPLICATION FILED MAR. 7, 1905.

3 SHEETS—SHEET 1.

WITNESSES:
E. C. McDowell
Jno. M. Harris

William H Collier, INVENTOR
BY
H. M. Marble
ATTORNEY.

No. 814,275. PATENTED MAR. 6, 1906.
W. H. COLLIER.
VALVE GEAR FOR STEAM AND OTHER FLUID PRESSURE ENGINES.
APPLICATION FILED MAR. 7, 1905.

3 SHEETS—SHEET 2.

WITNESSES:
E. C. McDowell
Wm. M. Harris

William H. Collier INVENTOR.

BY
H. M. Marble
ATTORNEY.

No. 814,275. PATENTED MAR. 6, 1906.
W. H. COLLIER.
VALVE GEAR FOR STEAM AND OTHER FLUID PRESSURE ENGINES.
APPLICATION FILED MAR. 7, 1905.

3 SHEETS—SHEET 3.

WITNESSES:
E. C. McDowell
Ihn M. Harris

William H Collier INVENTOR.

BY
H. M. Marble
ATTORNEY.

UNITED STATES PATENT OFFICE.

WILLIAM H. COLLIER, OF JACKSON, TENNESSEE.

VALVE-GEAR FOR STEAM AND OTHER FLUID-PRESSURE ENGINES.

No. 814,275.     Specification of Letters Patent.     Patented March 6, 1906.

Application filed March 7, 1905. Serial No. 248,798.

*To all whom it may concern:*

Be it known that I, WILLIAM H. COLLIER, a citizen of the United States, residing at Jackson, in the county of Madison and State of Tennessee, have invented certain new and useful Improvements in Valve-Gear for Steam and other Fluid-Pressure Engines; and I do hereby declare the following to be a full, clear, and exact description of the invention, such as will enable others skilled in the art to which it appertains to make and use the same.

My invention relates generally to improvements in valve-gear for steam and other fluid-pressure engines and comprises valves operated by fluid-pressure cylinders and pistons, the action of such cylinders and pistons being controlled by a suitable controlling-valve driven from some moving part of the engine.

The objects of my invention are to obtain a perfect distribution of the working fluid and wide and rapid port-opening and rapid port-closing with valves of simple construction; to avoid wire-drawing and excessive back pressure during exhaust; to permit small clearance-spaces; to avoid complication of valve-gear and the use of links, eccentrics, and other cumbersome parts; to provide in reversing-engines simple valve-gear capable of operating separate admission and exhaust valves at both ends of the cylinder; to permit variation of point of cut-off through wide limits; to permit variation in degree of compression, and, generally, to make the valve-gear simple, compact, durable, efficient, rapid in operation, free from liability to derangement, and relatively inexpensive.

In the accompanying drawings I illustrate one embodiment of my invention, the same being designed with particular reference to the use of my valve-gear on locomotives, in which connection the said valve-gear is shown in certain of the drawings.

Figure 2:
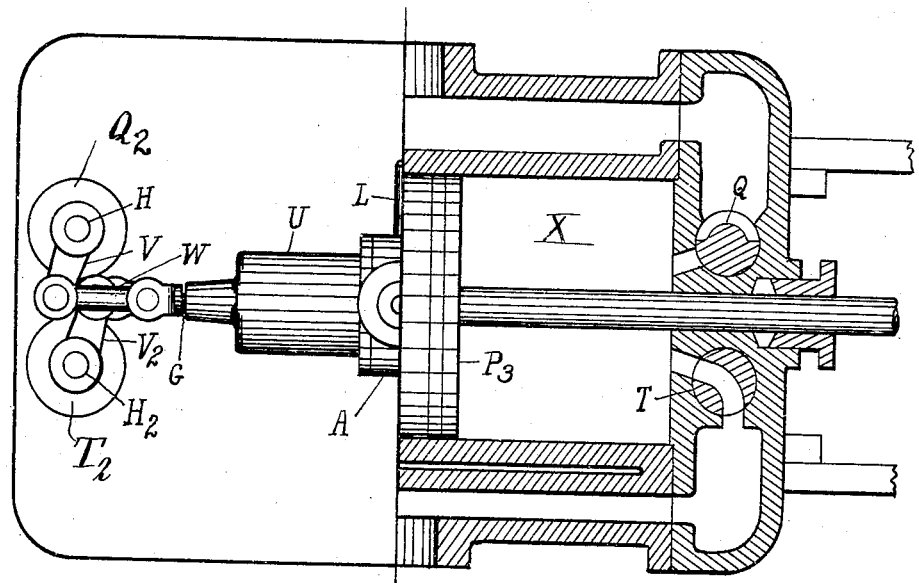
Figure 1:
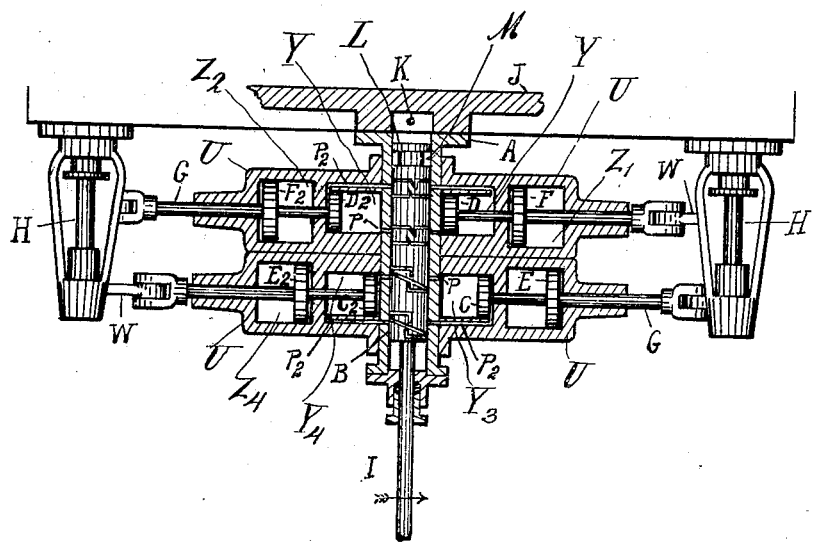
Figure 4:
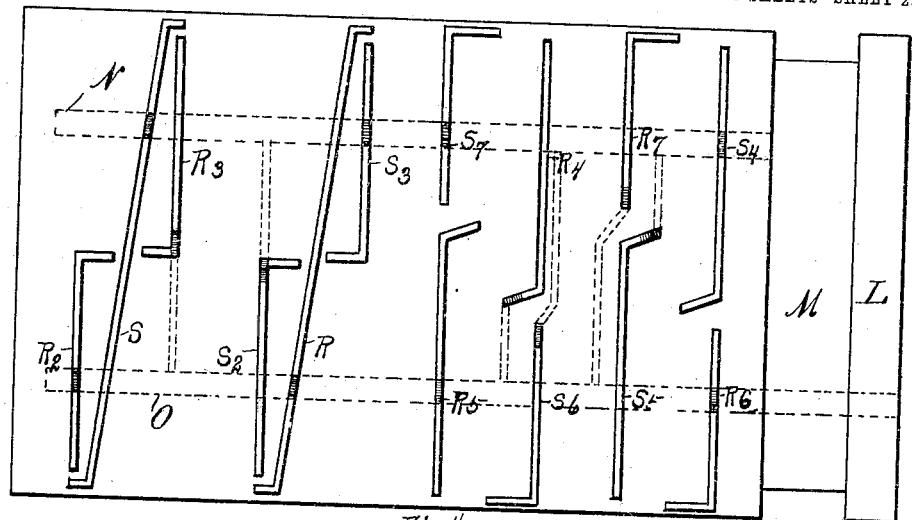
Figure 3:
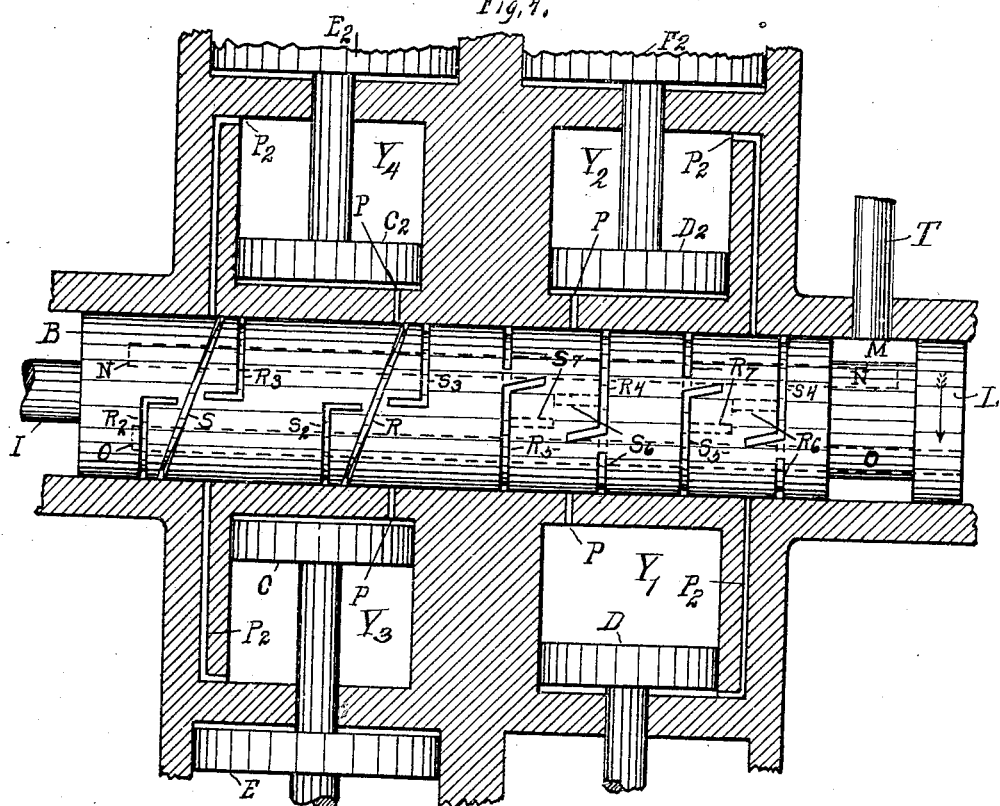
Figure 6:
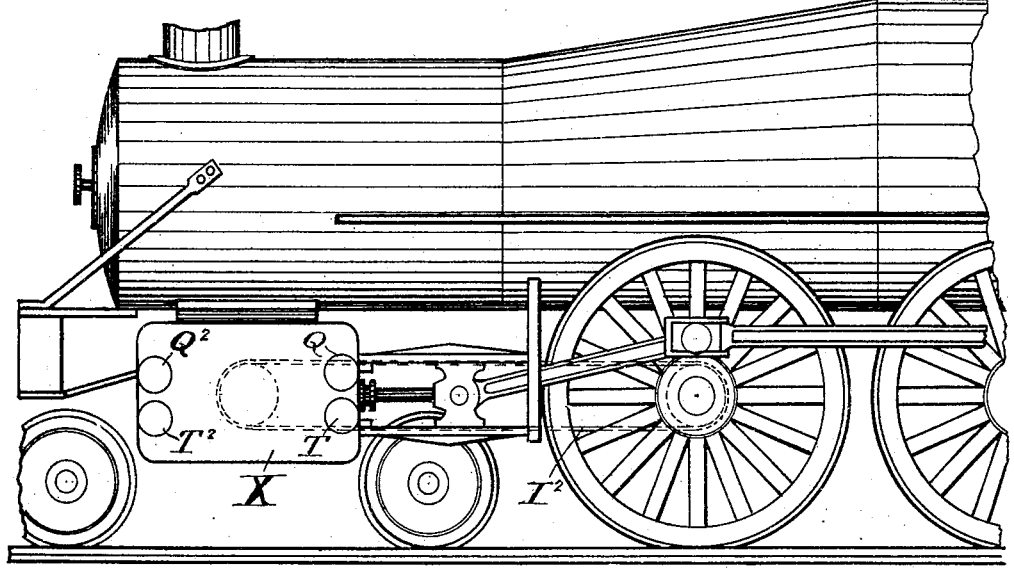
Figure 5:
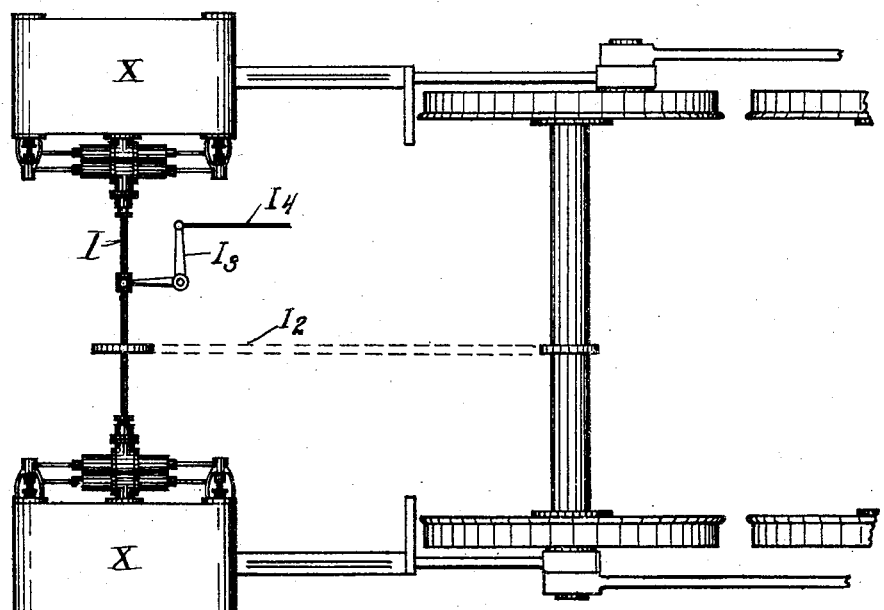

In the said drawings, Figure 1 shows a central horizontal section through the valve-gear of one cylinder. Fig. 2 shows a partial side view and partial central vertical section of an engine-cylinder fitted with my improved valve-gear. Fig. 3 shows a central horizontal section through the valve-operating cylinders and the casing of the controlling-valve. Fig. 4 shows a development of the controlling-valve and in particular illustrates the arrangement of the ports of such valves. Fig. 5 shows a top view of two cylinders of a locomotive and the valve-gear thereof and the adjacent working parts of the engine. Fig. 6 shows a side view of the front portion of a locomotive provided with my improved valve-gear.

Referring now to the drawings, reference character X designates the engine-cylinders, and in Fig. 2, $P^3$ designates one of the pistons thereof. The general construction of these cylinders and pistons may correspond with customary practice, except that I prefer to provide said cylinders with separate admission-valves Q and $Q^2$ and exhaust-valves T and $T^2$ for both ends of the cylinder, these valves being preferably of the rotary type and having valve-stems H and $H^2$, respectively, projecting through suitable stuffing-boxes, by which said valves may be operated. The valve-gear proper comprises a body A, secured to the side of the engine-cylinder containing the controlling-valve B and having secured to it the bodies U of the valve-operating cylinders. These cylinder-bodies contain actuating-cylinders $Y'$ $Y^2$ $Y^3$ $Y^4$ and cushion-cylinders $Z'$ $Z^2$ $Z^3$ $Z^4$, each actuating-cylinder and its corresponding cushion-cylinder being preferably arranged tandem, as shown, and in said cylinders are corresponding pistons D $D^2$, C $C^2$, F $F^2$, and E $E^2$, respectively. The pistons of these cylinders are connected to their corresponding valves by piston-rods G, links W, and valve-arms V and $V^2$.

The four actuating-cylinders $Y'$ to $Y^4$ are provided with ports P and $P^2$, connecting the two ends of each cylinder with the chamber of controlling-valve B. For controlling admission of working fluid to said cylinders and exhaust of such fluid therefrom said valve B is provided with supply-ports S, $S^2$, $S^3$, $S^4$, $S^5$, $S^6$, and $S^7$, communicating with a longitudinal passage N, (shown in dotted lines in Fig. 3,) and with exhaust-ports R, $R^2$, $R^3$, $R^4$, $R^5$, $R^6$, and $R^7$, communicating with a longitudinal passage O. (Shown in dotted lines in Fig. 3.) Passage N of the valve opens into an annular space M, formed by a groove in the valve B, and a pipe T supplies working fluid to this space M. Passage O opens into a chamber beyond the valve and separated from space M by the head L of the valve, and a pipe K serves to convey exhaust away from this chamber, pipe K being connected customarily to the main exhaust-pipe of the engine. Of these ports above mentioned $R^3$ $S^3$ $R^4$ $S^6$ $S^4$ $R^6$ are effective only for motion ahead, ports $R^2$ $S^2$ $S^7$ $R^5$ $R^7$ $S^5$ not being in registry with any of the ports P and $P^2$ in any part of the revolution of valve B while said valve is set for ahead motion. Conversely, when the valve is shifted longitudinally to reverse the engine only the latter series of ports $R^2$, $S^2$, &c., come opposite the ports P and $P^2$, the first series of ports $R^3$ $S^3$, &c., being out of registry with ports P and $P^2$ at all times while the valve is in the position for reverse running. Ports S and R are oblique or spiral ports to permit variation in the point of cut-off, as hereinafter described.

While the engine is running, the only portions of ports $R^2$, $R^3$, $S^2$, $S^3$, $R^5$, $S^7$, $S^6$, $R^4$, $S^5$, $R^7$, $R^6$, and $S^4$ which are effective are the portions of said ports or grooves which are axial, or nearly so. Nevertheless, said grooves or ports extend circumferentially around the valve for considerable distances; but such circumferential portions of the grooves come opposite the ports P and $P^2$ only when the valve B is moved to an extreme position for starting.

The operation of this valve-gear is as follows: With the valve B in the position shown in Fig. 3 and rotating in the direction indicated by the arrow, when port $S^3$ comes into registry with port P of valve-actuating cylinder $Y^3$ fluid under pressure passes from chamber M, through passage N and ports $S^3$ and P, into cylinder $Y^3$, and since at the same instant port $R^3$ has come into registry with the port $P^2$ of cylinder $Y^3$, opening the outer end of said cylinder to exhaust, the piston C is moved quickly outward, opening the admission-valve Q at the rear end of the engine-cylinder. As valve B continues to rotate ports $S^3$ and $R^3$ pass beyond ports P and $P^2$, respectively; but piston C remains, nevertheless, in its outer position until the spiral port S comes into registry with port $P^2$ of cylinder $Y^3$ and port R at the same instant comes into registry with port P of said cylinder, whereupon the inner end of cylinder $Y^3$ will be opened to exhaust and the outer end will be opened to supply, and the piston C of said cylinder will be moved in quickly, closing valve Q, and thus producing cut-off. Near the end of the stroke ports $S^6$ and $R^6$ will come into registry with ports P and $P^2$ of cylinder $Y'$, thereby moving the piston D of said cylinder outward and opening the exhaust-valve T of the engine-cylinder to exhaust. At the beginning of the next stroke ports $S^3$ and $R^3$ in like manner come into registry with the ports P and $P^2$ of cylinder $Y^4$, moving the piston $C^2$ of that cylinder outward and opening the admission-valve $Q^2$ of the front end of the cylinder. Cut-off in the front end of the engine-cylinder takes place when the spiral ports R and S come into registry with ports P and $P^2$ of cylinder $Y^4$, and near the end of the stroke ports $S^4$ and $R^4$ register with ports P and $P^2$ of cylinder $Y'$, closing exhaust-valve T, and thus causing compression to begin in the rear end of the engine-cylinder, and an instant after ports $S^6$ and $R^6$ register with ports P and $P^2$ of cylinder $Y^2$, thus opening valve $T^2$ of the front end of the engine-cylinder to exhaust. The cycle of operations above described then recommences, exhaust-closure by the action of piston $D^2$ of cylinder $Y^2$, (which, to avoid confusion, was not mentioned before,) occurring when ports $S^4$ and $R^4$ register with ports P and $P^2$ of cylinder $Y^2$. It will be apparent that by moving the valve B in or out the time of cut-off may be varied, for the effect of such movement is to vary the time when ports S and R come into registry with ports P and $P^2$ of cylinders $Y^3$ and $Y^4$. It will further be obvious that by moving the valve B so that ports $R^2$, $S^2$, $R^5$, $S^7$, $S^5$, and $R^7$ come into registry with ports P and $P^2$ as the valve B revolves the engine will run in the opposite direction, cut-off being regulated as before by moving the valve B in or out slightly, and if the valve is moved to an intermediate position, so that none of the valve-ports $R^2$, $R^3$, $S^2$, and $S^3$ are in the paths of the ports P and $P^2$ of the actuating-cylinders, the supply of working fluid to the engine-cylinder X will cease altogether, since none of the valves of that cylinder will open, and the engine will stop. For starting the engine, especially for starting it in a direction opposite that in which it has been running previously, it may be necessary to move the valve clear over until the circumferential portions of the ports $R^3$ $S^3$, &c., or $R^2$ $S^2$, &c., as the case may be, come into registry with the ports P and $P^2$ of cylinders $Y'$ and $Y^3$, or $Y^2$ and $Y^4$, as the case may be. This insures opening of the proper admission and exhaust valves of the engine-cylinder to cause rotation in the desired direction. It will be noted that the horizontal portions of ports $R^5$, $R^4$, $S^5$, and $S^4$ are not truly axial, but are slightly spiral, thus producing variation in the degree of compression in the engine corresponding to the variation of the point of cut-off as the valve is moved in and out.

In the case of locomotives which comprise twin engines I may operate the controlling-valves of both cylinders by a single stem I, as shown in Fig. 5, this stem being driven from a convenient moving portion of the engine—as, for example, the front driver-axle —by suitable means—as, for example, a sprocket-chain $I^2$. For reversing the engines suitable means will be provided for shifting the stem I longitudinally—as, for example, a bell-crank $I^3$ engaging a collar on said stem and a connection $I^4$ to a suitable reverse-lever. It will be apparent that the ports of the controlling-valves of the two cylinders must be arranged oppositely in order that inward motion of one valve and outward motion of the other may cause similar changes in the direction of running of the two engines.

It will be seen that by this valve-gear the admission and exhaust valves of the engine-cylinder are operated very rapidly, and wide port-opening is obtained almost instantly, thus practically avoiding wire-drawing, the distribution of steam effected by this valve-gear being comparable to that which may be effected by the very best of the so-called "Corliss" or drop cut-off valve-gears, while the speed at which this valve-gear may be operated is not limited, as is the case with Corliss and similar gears. Nevertheless, the valve-gear contains very few parts and these are of simple construction and, moreover, are inclosed so as to be protected from dust and grit, and yet may be lubricated readily. The power absorbed by the valve-gear is small, as the actuating-cylinders may be small.

To avoid shock and vibration due to the sudden and rapid motion of the pistons C, C², D, and D², I provide cushion-cylinders Z', Z², Z³, and Z⁴, having in them pistons E, E², F, and F² upon the piston-rods of the valve-actuating pistons. These cushioning-pistons cushion the motion of the valve-actuating pistons as the latter near the ends of their strokes, so that the pistons do not hammer against the ends of their cylinders and noise and wear in the operation of the valve-gear is avoided.

What I claim is—

1. In a valve-gear, the combination with an engine-cylinder, and fluid-pressure-actuated valve-operating means therefor, of a controlling-valve for said valve-operating means, provided with a port adapted normally to register with a port of said valve-operating means in one position only of the valve, but provided with an extension adapted to register with said port of said valve-operating means in other positions of the valve when said valve is shifted.

2. In a valve-gear, the combination with an engine-cylinder, and fluid-pressure-actuated valve-operating means therefor, of a rotary controlling-valve for said valve-operating means, provided with a port extending longitudinally of the valve and adapted to register with a port of said valve-operating means in one position of the valve, said valve-port having a circumferential extension, normally out of registry with said other port, but adapted to be brought into registry therewith by shifting the valve.

3. In a valve-gear, the combination with an engine-cylinder, and valve means therefor comprising separate admission and exhaust valves, of fluid-pressure-actuated means for operating said admission-valve, a rotary controlling-valve therefor comprising a substantially longitudinal port adapted to register with a port of said valve-operating means and a spiral cut-off port likewise adapted to register with a port of said valve-operating means, and means for shifting said valve to vary the point of cut-off, said longitudinal port having a circumferential extension whereby by shifting said valve such port may be caused to register with the corresponding port of said valve-operating means in positions of the valve other than that in which such ports normally register.

4. In a valve-gear, the combination with an engine-cylinder, and valve means therefor comprising separate admission and exhaust valves, of fluid-pressure-actuated means for operating said admission-valve, a controlling-valve therefor comprising a port adapted to register with a port of said valve-operating means but longer than said latter port in a direction opposite the direction of normal movement of said valve, and comprising also an oblique cut-off port likewise adapted to register with a port of said valve-operating means, and means for moving said valve normally in one direction and for shifting said valve in another direction to vary the point of cut-off.

5. In a valve-gear, the combination with an engine-cylinder, and valve means therefor comprising separate admission and exhaust valves, of fluid-pressure-operated means for operating said exhaust-valve, a controlling-valve therefor comprising a port adapted to register with a port of said valve-operating means but longer than said latter port in a direction opposite the direction of normal movement of said valve, and comprising also an oblique compression-port likewise adapted to register with a port of said valve-operating means, and means for moving said valve normally in one direction and for shifting said valve in another direction to vary the point of exhaust-closure.

6. In a valve-gear, the combination with an engine-cylinder, and separate admission and exhaust valves therefor, of fluid-pressure-actuated means for operating said admission and exhaust valves, a controlling-valve therefor comprising ports controlling admission and release adapted to register with ports of said valve-operating means but longer than said latter ports in a direction opposite the direction of normal movement of the valve, and comprising also oblique cut-off and compression ports likewise adapted to register with ports of said valve-operating means, and means for moving said valve normally in one direction and for shifting said valve in another direction to vary the points of cut-off and exhaust-closure.

7. In a valve-gear, the combination with an engine-cylinder, and fluid-pressure-actuated valve-operating means therefor comprising a cylinder and piston, said cylinder having ports for admitting fluid under pressure to opposite sides of said piston, of a rotary controlling-valve having oblique cut-off ports, one for each of said cylinder-ports, one of said oblique ports connected to supply and the other to exhaust, and other ports in said valve arranged in pairs, the two ports of each pair arranged on opposite sides of a corresponding oblique port, but both connected to supply if that oblique port is connected to exhaust, and vice versa, and means for shifting said controlling-valve axially to vary the point of cut-off and to change the direction of motion.

8. In a valve-gear, the combination with an engine-cylinder, and fluid-pressure-actuated valve-operating means therefor comprising a cylinder and piston, said cylinder having ports for admitting fluid under pressure to opposite sides of said piston, of a rotary controlling-valve having oblique cut-off ports, one for each of said cylinder-ports, one of said oblique ports connected to supply and the other to exhaust, and other ports in said valve arranged in pairs, the two ports of each pair arranged on opposite sides of a corresponding oblique port and each comprising a substantial longitudinal portion and a circumferential extension, such circumferential extensions of the ports of each pair being in opposite directions, both ports of each such pair connected to supply if the oblique port between them is connected to exhaust, and vice versa, and means for shifting the controlling-valve axially to vary the point of cut-off and to reverse the engine.

In testimony whereof I affix my signature in the presence of two witnesses.

WILLIAM H. COLLIER.

Witnesses:
   C. W. FOWLER,
   H. M. MARBLE.